United States Patent [19]

Foladare et al.

[11] Patent Number: 5,598,457
[45] Date of Patent: Jan. 28, 1997

[54] TECHNIQUE FOR PROVIDING REDUNDANT CAPABILITY IN A PERSONAL MOBILE COMMUNICATION SYSTEM

[75] Inventors: Mark J. Foladare, Kendall Park; Shelley B. Goldman, East Brunswick; Aslam Y. Khan, Holmdel; Lyndon M. Pan, Little Silver; David P. Silverman, Somerville; Yao-Chung Tsao, Middletown; Roy Philip Weber, Bridgewater, all of N.J.

[73] Assignee: AT&T, Holmdel, N.J.

[21] Appl. No.: 316,613

[22] Filed: Sep. 30, 1994

[51] Int. Cl.⁶ .................................................. H04Q 7/38
[52] U.S. Cl. ................... 379/57; 379/58; 379/204
[58] Field of Search ........................... 379/57, 58, 45, 379/142, 62, 204, 59, 210, 63; 455/33.1

[56] References Cited

U.S. PATENT DOCUMENTS

| | | | |
|---|---|---|---|
| 4,577,065 | 3/1986 | Frey et al. | 379/204 |
| 4,635,251 | 6/1987 | Stanley et al. | 379/204 |
| 4,754,475 | 6/1988 | Pintos et al. | 379/142 |
| 4,829,554 | 5/1989 | Barnes et al. | 379/58 |
| 5,307,399 | 4/1994 | Dai et al. | 379/57 |
| 5,323,444 | 6/1994 | Ertz et al. | 379/45 |
| 5,327,480 | 7/1994 | Breeden | 379/57 |

*Primary Examiner*—William Cumming
*Attorney, Agent, or Firm*—Stephen M. Gurey

[57] ABSTRACT

In providing personal telephone calling capability as a service, for reliability purposes, it is necessary to have available several independent meet-me systems, to provide redundant capability in the event of a failure of any one of them. Each meet-me system has at least 1) one meet-me bridge and 2) its own telephone trunks directly connecting it to the telephone network over which it receives return calls. A problem with doing so is insuring that the return call is properly bridged to the caller's call when a) the telephone number for the return call is a predetermined translatable telephone number and b) the particular one of the meet-me systems to which the caller's call is connected is determined only upon receiving in the network the call placed by the caller. To overcome this problem, at least each time a caller's call is routed to different one of the meet-me systems, the network routing data base which translates the dialed translatable telephone number of the return telephone call into a network routing telephone number is updated so that it will direct a return call for the caller's call to the same meet-me system to which the caller's call was routed. Advantageously, a hot-spare standby is not needed for each meet-me system. Instead, one additional meet-me system provides the capability to back-up the failure of any single one of the other meet-me systems.

2 Claims, 5 Drawing Sheets

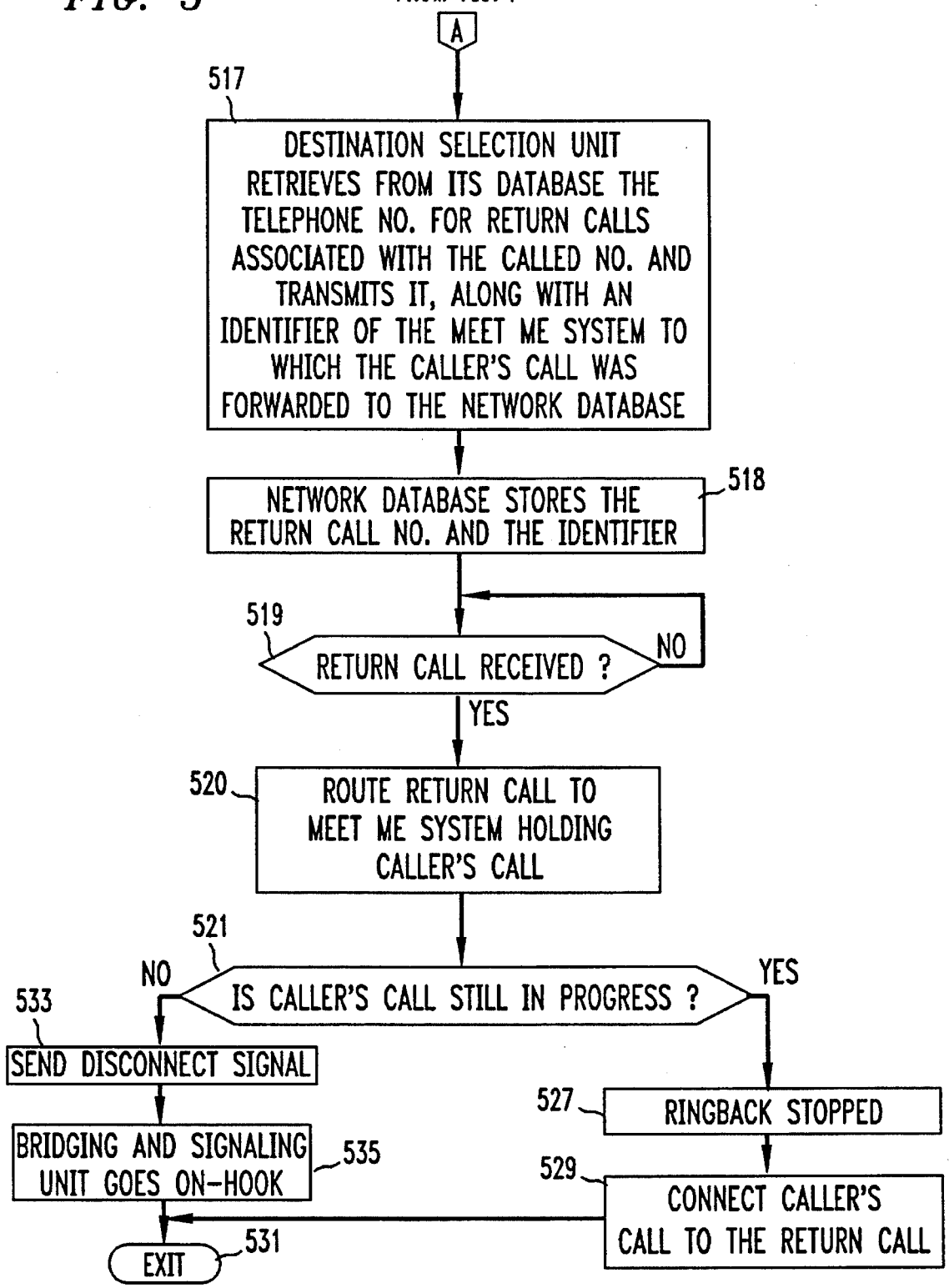

TECHNIQUE FOR PROVIDING REDUNDANT CAPABILITY IN A PERSONAL MOBILE COMMUNICATION SYSTEM

TECHNICAL FIELD

This invention relates to personal communications and, more particularly, to systems for setting up communications between a caller and a called individual using a combination of paging and call bridging.

BACKGROUND OF THE INVENTION

A problem with setting up telecommunications connections today is the difficulty of locating called individuals who are highly mobile. This problem is partially alleviated by mobile telephone technology and radio paging systems. In one prior art system, described in copending application Ser. No. 08/138,887 assigned to the same assignee as the present application, in response to a telephone call from a caller, a telephone call, namely, the so-called "return call", is placed by a called individual to a meet-me bridge at which the caller's telephone call may be held for connection to the return telephone call.

SUMMARY OF THE INVENTION

In providing such personal telephone calling capability as a service, for reliability purposes, it is necessary to have available several independent meet-me systems, to provide redundant capability in the event of a failure of any one of them. Each meet-me system has at least 1) one meet-me bridge and 2) its own telephone trunks directly connecting it to the telephone network over which it receives return calls. Such meet-me systems are typically physically distinct, although each may be networked with its peers so as to be able to communicate information between them.

We have recognized that a problem with having several independent meet-me systems is insuring that the return call is properly bridged to the caller's call when a) the telephone number for the return call is a predetermined translatable telephone number and b) the particular one of the meet-me systems to which the caller's call is connected is determined only upon receiving in the network the call placed by the caller. To overcome this problem, in accordance with the principles of the invention, at least each time a caller's call is routed to a different one of the meet-me systems, the network routing data base which translates the dialed translatable telephone number of the return telephone call into a network routing telephone number is updated so that it will direct a return call for the caller's call to the same meet-me system to which the caller's call was routed. Advantageously, a hot-spare standby is not needed for each meet-me system. Instead, one additional meet-me system provides the capability to back-up the failure of any single one of the other meet-me systems.

BRIEF DESCRIPTION OF THE DRAWING

In the drawing:

FIGS. 4 and 5, when connected together, show a flow chart of an exemplary process for completing a telephone call placed to the personal number of an individual associated with the personal communications unit shown in FIG. 1.

DETAILED DESCRIPTION

Figure 1:
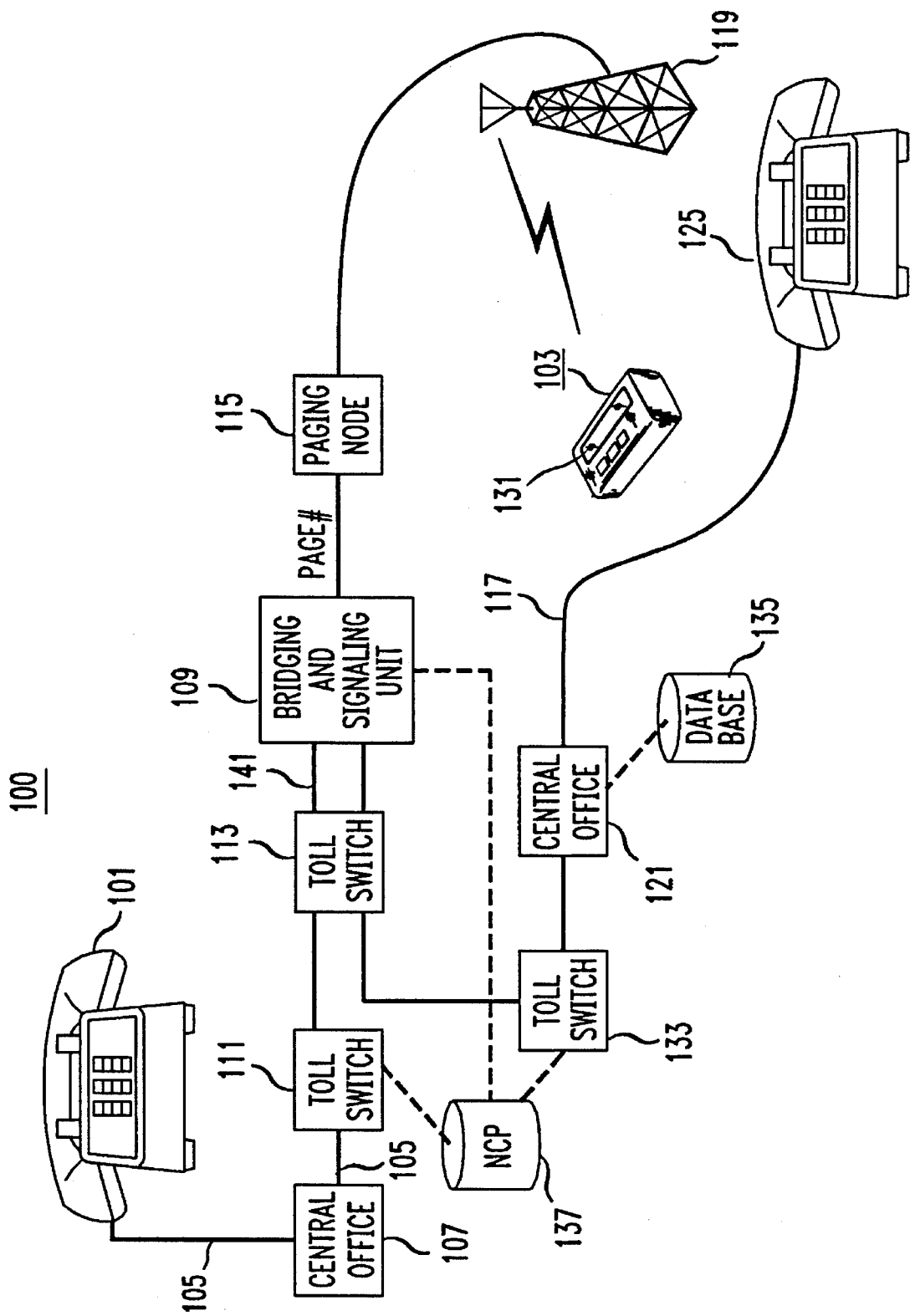
FIG. 1 shows an arrangement for providing telecommunications services, in accordance with the principles of the invention.

FIG. 1 shows arrangement 100 for providing telecommunications services, in accordance with the principles of the invention. A caller places a telephone call from calling telephone 101 to the personal telephone number of an individual associated with pager 103. The caller's telephone call passes over telephone line 105 to central office 107. Central office 107, in turn, routes the call to bridging and signaling unit 109, which is associated with the called number. This is done in the conventional manner. As shown, the caller's telephone call is routed by toll switch 111 through toll switch 113, which is connected to bridging and signaling unit 109. Pager 103 is also associated with the called personal telephone number, as discussed further below.

Bridging and signaling unit 109 implements a plurality of so-called "meet-me bridges" each of which is for connecting at least two incoming telephone calls to each other. Upon receipt of the caller's telephone call, bridging and signaling unit 109 forwards paging information to paging node 115. The paging information includes a predetermined code that uniquely identifies the called individual's pager 103. A copy of the predetermined code is stored within pager 103. Paging node 115 causes a paging signal containing the paging information to be broadcast from paging tower 119. Pagers and paging systems are well known in the art.

Pager 103 receives paging signals transmitted from paging tower 119. In the event that the code contained within the paging information of a paging signal matches the predetermined code stored in pager 103, pager 103 alerts. In response to the alerting by pager 103, the owner of pager 103 places a telephone call, which is the so-called "return call", from telephone 125 to a particular predetermined telephone number. Such a return call may be automatically placed if pager 103 and telephone 125 are incorporated into a single device. As such, central office 121 receives the return telephone call and routes it to bridging and signaling unit 109 for connection to the caller's telephone call. To this end, central office 121 routes the return call to toll switch 133, e.g., of an inter-exchange carrier.

The telephone number of the return telephone call is translatable, i.e., a data base lookup must be performed to determine the routing telephone number to which the call is actually completed, e.g., an 800-type of telephone number. An advantage of using an 800-type of telephone number is that it allows the owner of pager 103 to place the return telephone call without having any information about the area code of the telephone line which he is using. The association of central office 121 with database 135 is for the central office to know to which interexchange carrier to route the call. The use by toll switch 133 of database 137 in the routing process will be explained hereinbelow.

Figure 2:
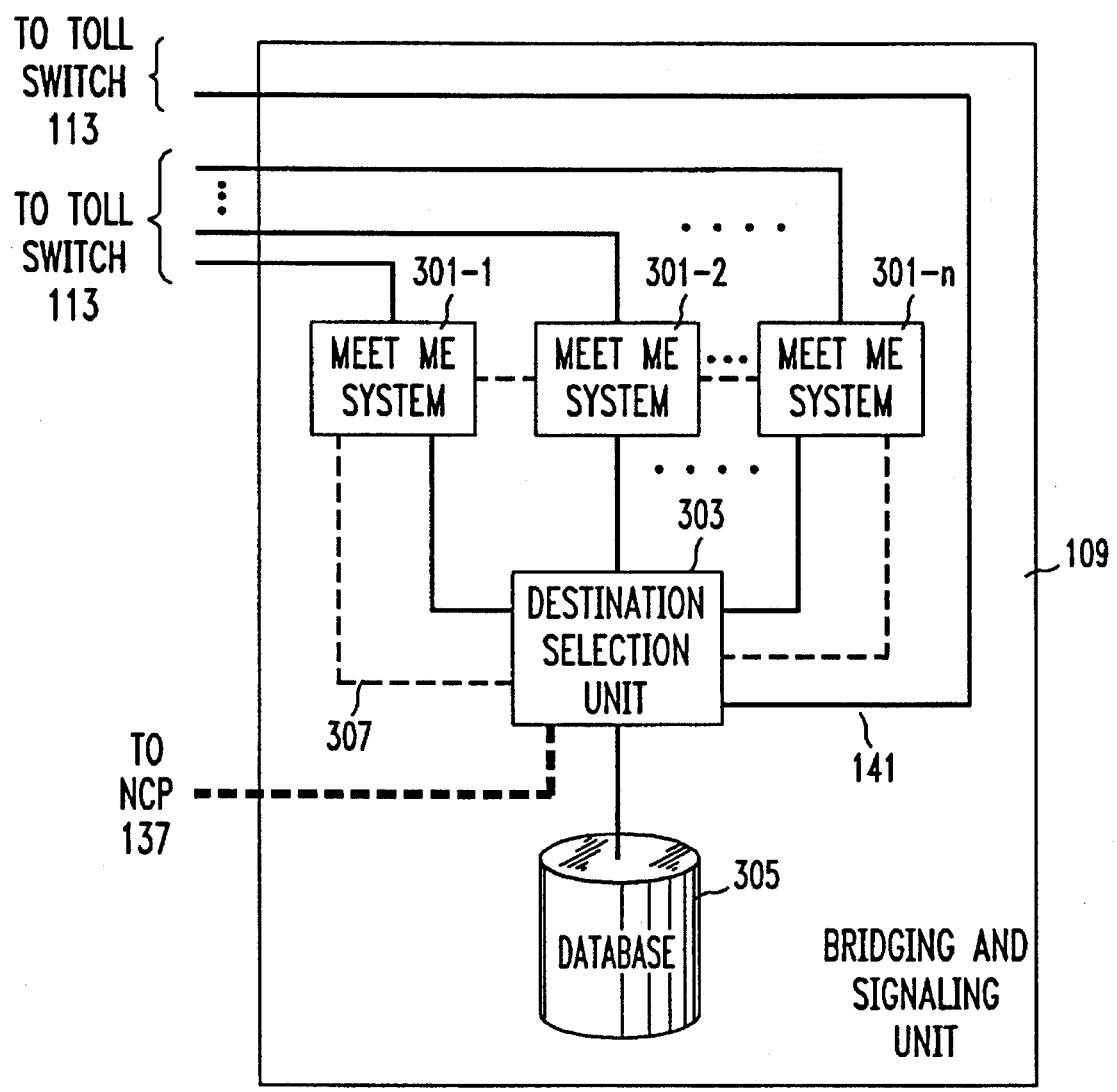
FIG. 2 shows, in block diagram form, an expanded view of the bridging and signaling unit shown in FIG. 1.

FIG. 2 shows, in block diagram form, an expanded view of an exemplary bridging and signaling unit 109. As shown, bridging and signaling unit 109 includes a) meet-me systems 301, which includes meet-me system 301-1, 301-2, . . . , 301-n, b) destination selection unit 303, and c) data base 305. Each meet-me system 301 implements within itself at least one meet-me bridge. Also, each meet-me system 301 has its own telephone trunks which connect it to the telephone network via toll switch 113. Meet-me systems 301 are physically distinct, although they are each connected via local area network 307. Local area network 307 also connects meet-me systems 301 to destination selection unit 303. It is noted that local area network 307 may be replaced by a wide area network, so that meet-me systems 301 may each be geographically diverse. Destination selection unit 303 is connected by at least one telephone trunk 141 to toll switch 113. Destination selection unit 303 is also connected by telephone circuits to each of meet-me systems 301 so that it can forward each call received from a caller over trunk 141 to one of meet-me systems 301. For example, destination selection unit 303 may be a specially programmed switch or PBX.

Figure 3:
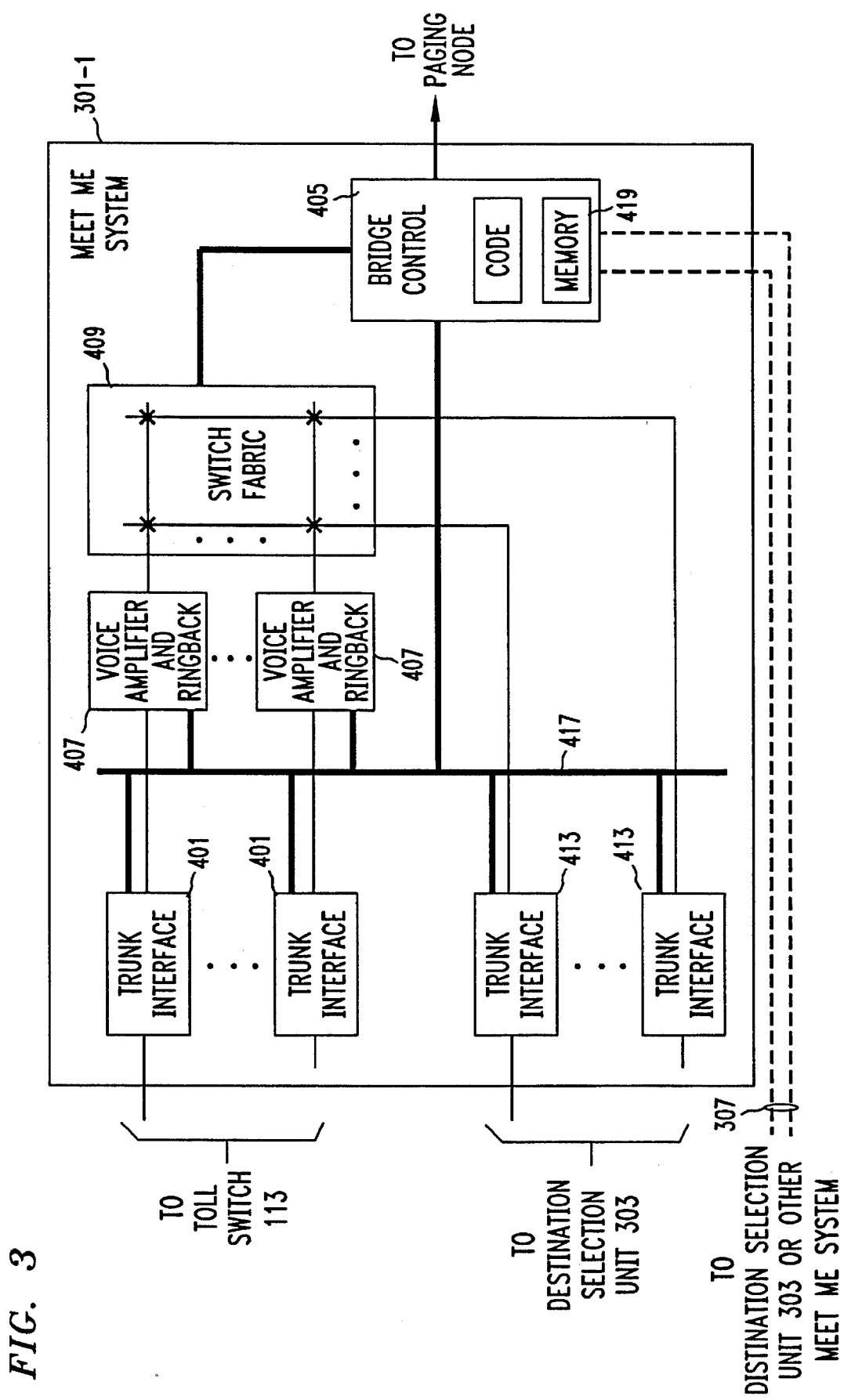
FIG. 3 shows, in block diagram form, an expanded view of one of the meet-me systems shown in FIG. 2.

FIG. 3 shows, in block diagram form, an expanded view of meet-me system 301-1. Meet-me system 301-1 includes: a) trunk interfaces 401, b) bridge control 405, c) voice amplifier and ringback units 407, d) switch fabric 409, and e) trunk interfaces 413. Bridge control 405 controls and coordinates the operation of meet-me system 301-1 by communicating commands and information over control bus 417. Bridge control 405 communicates via LAN 307 with the others of meet-me systems 301 and destination selection unit 303 (FIG. 2). In one embodiment, trunk interfaces 401 and 413 are T-1 or ISDN primary rate interfaces (PRI). The design of such trunk interfaces is well known in the art. Also, embodiments of the invention can include the processing of both in-band and out-of-band signals.

A call placed by a caller to the personal number of an individual associated with pager 103 (FIG. 1 ) is received at destination selection unit 303 (FIG. 2). In the exemplary embodiment of the invention, destination selection unit 303 obtains the telephone number that was dialed by the caller, e.g., over a signaling channel on trunk 141. However, it will be recognized that in other embodiments of the invention the telephone number may be obtained using in-band or out-of-band signaling. Destination selection unit 303 selects one of meet-me systems 301 to handle the call and connects the call through itself to the selected one of meet-me system 301. One of a meet-me systems 301 must be operational and have an available meet-me bridge to be selected. The telephone number that was dialed by the caller is supplied by destination selection unit 303 to the selected one of meet-me systems 301, via LAN 307. Alternatively, the dialed telephone number may be supplied over the connection from destination selection unit 303 to the selected one of meet-me units 301 via one of trunk interfaces 401.

Upon receiving an incoming call from a caller at one of meet-me systems 301, the meet-me system's bridge control 405 instructs one of voice amplifier and audible ring units 407 to supply ringback tone to the caller via the one of trunk interfaces 401 at which the call arrived. Answer supervision may be supplied so that an optional personal identification number (PIN) may be received from the caller. Such a PIN is detected by trunk interface 413 and forwarded to bridge control 405. This optional PIN may be transmitted to pager 103 as part of the calling information. If answer supervision is supplied, the caller is charged for the call from the time the answer supervision is supplied until the call is disconnected.

Bridge control 405 contains memory 419. Memory 419 maps the received digits of the called individual's personal telephone number to the predetermined code stored in the pager 103 associated with the called individual. Thereafter, bridge control 405 supplies to paging node 115 (FIG. 1) the telephone number of the predetermined code of the called individual.

Destination selection unit 303 retrieves from data base 305 a telephone number that was associated with the called telephone number and to which the return call, if any, will be placed for the called telephone number. Table 1 is an exemplary destination selection unit record stored in destination selection unit 303. Table 1 shows the association of a) the called party's telephone number, which is dialed by the calling party, b) the telephone number to which the called party will place a return call to meet the calling party, and c) the telephone number of the one of meet-me systems 301 which was last selected for use by a call to the called party's telephone number.

TABLE 1

| Destination Selection Unit Record | | |
|---|---|---|
| Called Party's Number | Return Call Number | Meet-Me System Identifier |
| 800-555-1234 | 800-555-1235 | 555-631-6167 (meet-me system 301-1) |
| 800-555-7209 | 800-555-7210 | 555-631-8888 (meet-me system 301-2) |

In accordance with the principles of the invention, the retrieved associated return call telephone number is transmitted to network data base 137, e.g., via a signaling network connection, along with an identifier of the meet-me system to which the caller's call was forwarded by destination selection unit 303. An example of network database 137 is the well known network control point (NCP). The identifier of the meet-me system to which the caller's call was forwarded may be a particular trunk identifier that terminates at the meet-me system. Network data base 137 stores the return call telephone number and the meet-me system identifier in association, for example, as shown in Table 2, so that when a call placed to the return call telephone number is received at a toll switch, it is routed directly to the meet-me system to which the caller's call was forwarded by destination selection unit 303, i.e., without passing through destination selection unit 303, in accordance with the principles of the invention.

TABLE 2

| Network Database Record | | |
|---|---|---|
| Translatable Number | Routing Telephone Number | Explanation (not stored) |
| 800-555-1234 | 908-658-2020 | destination selection unit 303 |
| 800-555-1235 | 555-631-6167 | trunk identifying meet-me system 301-1 |
| 800-555-1236 | 908-949-3179 | non-personal translatable telephone number |

Upon receipt of a return telephone call at one of trunk interfaces 413 of the selected one of meet-me units 301, bridge control 405 determines from the dialed telephone numbers at which of trunk interfaces 401 is waiting the call of the caller that corresponds to this return telephone call. If the caller's telephone call is still waiting at one of trunk interfaces 401, bridge control 405 commands switch fabric 409 to interconnect the caller's telephone call at one of trunk interfaces 401 with its respective return telephone call at one of trunk interfaces 413. Bridge control 405 also commands the respective one of voice amplifier and ringback units 407 to cease supplying ringback tone to the caller and to switch to amplification mode. This is necessary because a back-to-back connection of two separate telephone calls requires amplification to overcome the attendant loss of signal strength. It is noted that the calls described herein, in which the called party is paged and must place a return telephone call to be connected to the calling party, are known as "revertive calls".

It is noted that the structure of a meet-me system shown FIG. 3, with different instructions stored in the code section of bridge control 405 can also be used to implement destination selection unit 303. In such an embodiment, trunk interfaces 401 would still be connected to toll switch 113, but trunk interfaces 4 13 would be connected to the meet-me systems. Given the description herein, such an embodiment of the invention will be obvious to one of ordinary skill in the art.

Figure 4:
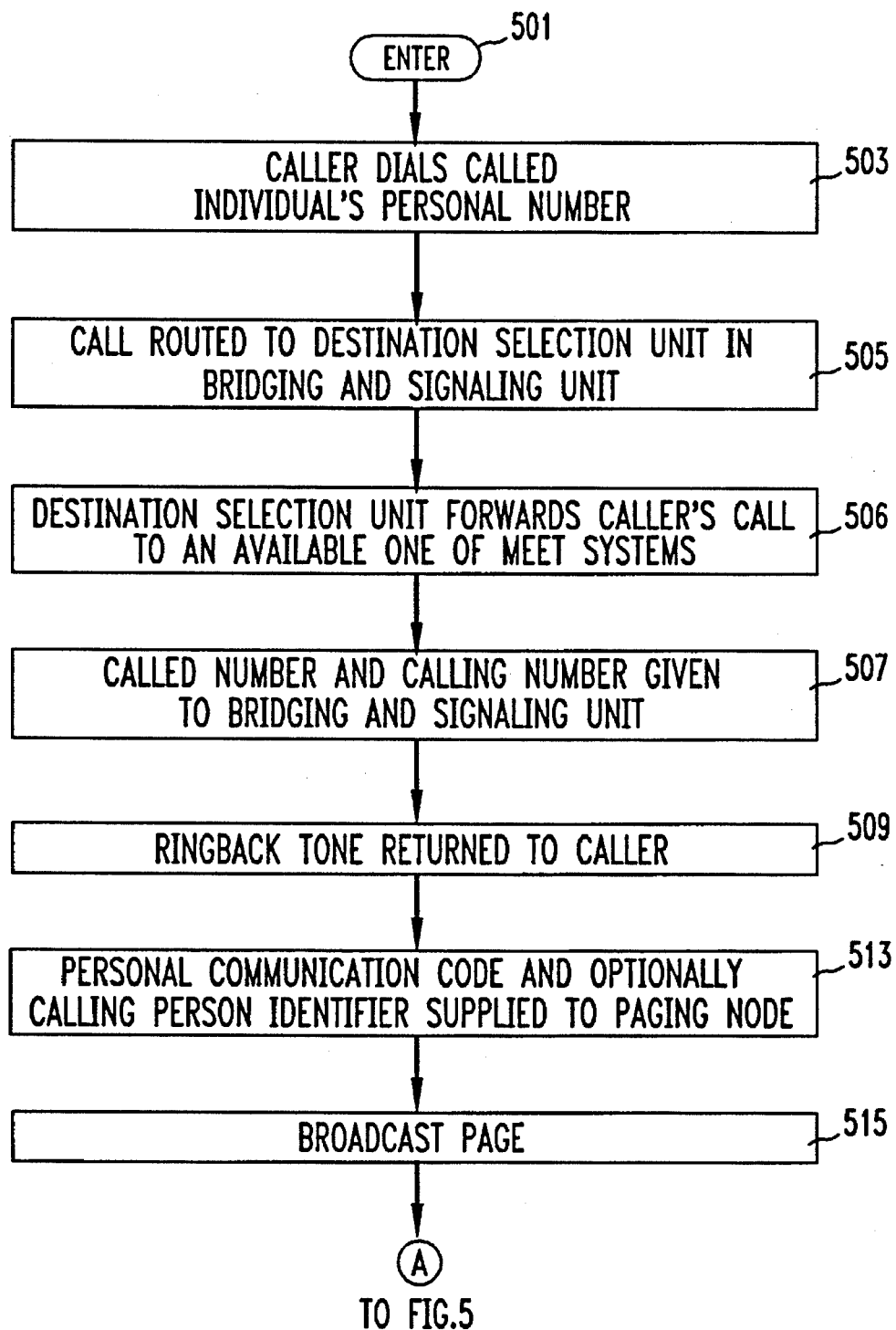

FIGS. 4 and 5, when connected together, show a flow chart of an exemplary process for completing a telephone call placed to the personal number of a called individual associated with pager 103 (FIG. 1), in accordance with the principles of the invention. The process begins in step 501 (FIG. 3) when a caller decides to make a call to the individual associated with pager 103 using his personal number. To this end, in step 503, the caller dials the called individual's personal number at telephone 101 (FIG. 1 ). A telecommunications carrier routes the call to destination selection unit 303 of bridging and signaling unit 109 in step 505. This is achieved by programming data base 305 to route all calls to personal telephone numbers used by subscribers of such a personal reach service to destination selection unit 303.

In step 506, destination selection unit 303 forwards the caller's call to one of meet-me systems 301. The particular process for selecting a meet-me system to route the caller's call to is at the discretion of the implementor. However, it is required that the selected meet-me system be functioning and have available capacity. Those skilled in the art will be able to readily develop such a selection process. Hereinafter, it is assumed that an exemplary first call is routed to meet-me system 301-1. Thereafter, in step 507, the telecommunications carrier supplies the called number and, if available, an identifier of the calling person, e.g., the calling number or a personal identification number (PIN), to destination selection unit 303. Destination selection unit 303 stores this information and also forwards it via LAN/WAN 307 to the selected one of meet-me systems 301.

In step 509, meet-me system 301-1 supplies ringback tone to telephone 101. Next, in step 513, meet-me system 301-1 sends to paging node 115 the paging information, i.e., the predetermined code of the called individual that is stored within pager 103, and optionally, an indication of the identity of the caller, in step 513. In step 515, paging tower 119 broadcasts a paging signal that includes the paging information.

Next, in step 517, destination selection unit 303 retrieves from data base 305 the telephone number for a return call that is associated with the called telephone number. In accordance with the principles of the invention, the retrieved associated return call telephone number is transmitted to network data base 137, along with an identifier of the meet-me system to which the caller's call was forwarded by destination selection unit 303. The identifier of the meet-me system to which the caller's call was forwarded may be a particular trunk identifier that terminates at the meet-me system. In accordance with the principles of the invention, in step 518, network data base 137 stores the return call telephone number and the meet-me system identifier in association, so that when a call placed to the return call telephone number is received at a toll switch, it is routed directly to the meet-me system to which the caller's call was forwarded by destination selection unit 303, i.e., without passing through destination selection unit 303.

Control then passes to conditional branch point 519, which tests to determine if the return telephone call has been received from the owner of pager 103. If the test result in step 519 is NO, control loops back to conditional branch point 519 to continue waiting for the return call. Of course, the looping may be terminated by the expiry of a preset time duration or the caller's going on-hook. If the test result in step 519 is YES, control passes to step 520, in which the return call is caused to be routed directly to the one of meet-me systems 303 holding the caller's call, in accordance with the principles of the invention.

Next, in conditional branch point 521, meet-me system 301-1 tests to determine if the caller's telephone call is still in progress. If the test result in step 521 is YES, control passes to step 527, in which meet-me system 301-1 stops sending ringback tone to telephone 101. Then, in step 529, meet-me system 301-1 interconnects the caller's telephone call and the return telephone call. This allows the caller to talk with the called individual. The process is then exited in step 531.

At the end of a conversation between the called and calling parties, i.e., after the called and calling parties were successfully connected together, either the caller or the called individual will go on-hook. At that time, the call between the on-hook party and meet-me system 301-1 is taken down. Furthermore, meet-me system 301-1 causes the call by the party not going on-hook to be taken down as well.

As noted above, display 13 1 (FIG. 1) can display the number of the caller if pager 103 receives the necessary information. The paging information may contain the caller's telephone number or other identifying information, e.g., a PIN.

It is noted that the principles of the invention are applicable to other types of telephone calls as well, e.g., fax, data, video. Optionally, in accordance with an aspect of the invention, prior to selecting a meet-me system for each caller's call, destination selection unit 303 retrieves a record of which meet-me system handled the last call to the called party's number. If the destination selection unit 303 determines that the meet-me system indicated by the retrieved record is free, it forwards the call to that meet-me system. Furthermore, since network database 137 already has stored the return call telephone number associated with the selected meet-me system, no update of network database 137 is needed. Therefore, steps 517 and 518 may be skipped. Advantageously, utilization of the network resources is reduced.

It is also noted that bridging and signaling unit 109 may include, for redundancy and load sharing purposes, a second front end processor. This second front end processor would be connected to the LAN/WAN. In the event that a caller's call cannot be completed to the front end processor to which it is primarily programmed to be completed, using the alternate destination routing feature of data base 137, the caller's call could be rerouted to the other front end processor, which is programmed as the alternate destination.

It is noted that telephone 125 may be a mobile telephone station. If so, central office 121 is a mobile telephone switching office (MTSO).

It is noted that the techniques of the invention may be applied where many of the called parties share a single telephone number to which they each place their return telephone calls, the ultimate meet-me systems to which the individual return calls are routed being determined by personal identification numbers (PINs), e.g., four digit numbers, that are supplied by the individual called parties to particularly identify themselves. In such an application, destination selection unit 303 a) stores the expected PIN for the called party in association with the return call telephone number and b) supplies the PIN to network database 137 along with return call telephone number and the identifier of the meet-me system to which the caller's call was forwarded. Upon receipt of a call to the shared return telephone number, network database 137 forwards the return call to the one of meet-me systems identified by the shared return telephone number and having a stored PIN that matches a PIN received from the called party. The PIN may be obtained from the called party using well known techniques, such as those used to provide advanced 800 service.

In one embodiment of the invention, several calling parties may place calls to the same called party. In such a case, preferably, destination selection unit 303 routes each of the calling parties' calls to the same one of meet-me systems 301. Doing so permits the called party to select and/or switch between the various calling parties. In an alternative implementation, in response to signaling from the called party, destination signaling unit 303 can communicate with network database 137 to transfer the called party's return call between the meet-me systems 301 to which the calling parties' calls were routed, so as to connect the called party to the various calling parties.

It is also noted that in some embodiments of the invention, once a caller's call has been routed to the selected one of meet-me systems 301, the caller's call may be rerouted in the telephone network, using well known network rerouting techniques, so as to connect it directly to the selected one of meet-me systems 301 and thereby bypass destination selection unit 303. Doing so increases the number of calls that can be handled by bridging and signaling unit 109.

The foregoing merely illustrates the principles of the inventions. It will thus be appreciated that those skilled in the art will be able to devise various arrangements which, although not explicitly described or shown herein, embody the principles of the invention and are thus within its spirit and scope.

What is claimed is:

1. A method for use in completing a first telephone call of a first party to a second party, the method comprising the steps of:

receiving said first telephone call; then selecting a first one of a plurality of meet-me systems, wherein if one of the plurality of meet-me systems handled a most recent call to the second party and information corresponding to the one of the plurality of meet-me systems is stored in a network data base, then said one of the plurality of meet-me systems is selected as the first one of the plurality of meet-me systems;

routing said first telephone call to said selected first one of the plurality of meet-me systems if said selected first one of the plurality of meet-me systems is available;

connecting a return call by said second party to said first telephone call based on the information stored in the network data base.

2. The method as defined in further including the steps of:

selecting a second one of said plurality of meet-me systems if the first one of the plurality of meet-me systems is not available;

routing said first telephone call to said second one of said plurality of meet-me systems; and storing information in said network data base corresponding to said second one of said plurality of meet-me systems.

* * * * *